6543X
J. CRAIL.
Churn.
Patented May 5, 1831.
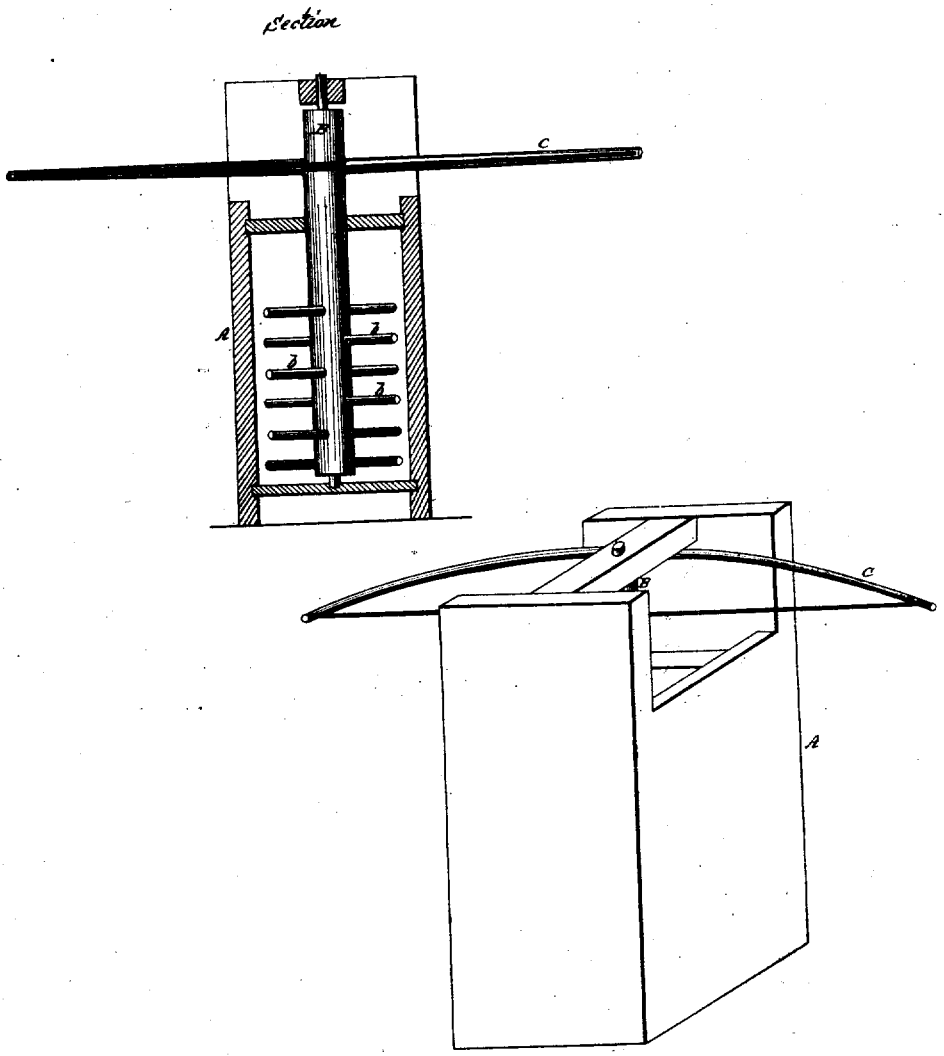
THE NORRIS PETERS CO., PHOTO-LITHO., WASHINGTON, D. C.

May 5. 1831

Joseph Craig Warren Ohio 6543X

Letters Patent

The schedule referred to in these Letters Patent and making part of the same
Containing a description in the words of the said Joseph Craig himself
of his improvement in the butter churn To all to whom these presents shall come: Be it known that I Joseph Craig of
Warren in the County of Trumbull and State of Ohio have invented a new and
useful improvement in the butter Churn and that the following is a full and
exact description of the construction and operation of the said machine as invented
or improved by me to wit.

The body of the Churn is a square box composed of four
sides and a bottom, the sides of the churn are made of boards of one and one fourth
inch in thickness halved and nailed together at the corners the grain of the wood
running perpendicularly. The length of two of the sides is twenty three inches and
the other two sides thirty inches. The bottom is let into a groove made in the sides two
inches above the lower end. The lid is of two pieces and let into the top of the Churn
one inch below the top of the short sides. The depth of the churn in the clear is twenty
three inches, the width [illegible] inches. A Shaft two and a half inches in diameter
passes through the centre of the Churn vertically and plays on a gudgeon or
pivot, on the lower end which is let into the bottom of the churn. A pin on the top
end of the Shaft plays in a piece of timber three inches in breadth and one and a
half in thickness which passes over the centre of the Churn and is fastened at each
end by tenons let into the tops of the long sides, six rounds or rods three eighths
of an inch in diameter and ten inches in length and put through the Shaft
at the lower end the first one inch from the bottom and the next at right an-
gles to the first one and a half inch above the first and so on alternately each
round crossing the one next to it at right angles and one and a half inch from it
The body of the churn if preferred may be made of Coopers ware with one Stave on
each side to extend seven inches above the top of the Churn. The shaft of the
churn is put in motion by a [illegible] and Shaft [illegible]. The [illegible] and a half feet long the end passes once round ~~round~~ the shaft between the two ends of the churn and the cross piece which is let into the long shoulder or sides of the churn and is made fast to each end of the box. The motion is communicated to the shaft by hand.

What I claim as particularly new and of my own invention is the manner of moving the shaft (or dasher) by a bow and strap

Witnesses
[illegible] Richard
David [illegible]

Joseph Crail

[57] [illegible]